US007624188B2

(12) United States Patent
Koskelainen

(10) Patent No.: US 7,624,188 B2
(45) Date of Patent: Nov. 24, 2009

(54) APPARATUS AND METHOD TO PROVIDE CONFERENCE DATA SHARING BETWEEN USER AGENT CONFERENCE PARTICIPANTS

(75) Inventor: Petri Koskelainen, Tampere (FI)

(73) Assignee: Nokia Corporation, Espoo (FI)

( * ) Notice: Subject to any disclaimer, the term of this patent is extended or adjusted under 35 U.S.C. 154(b) by 742 days.

(21) Appl. No.: 10/838,130

(22) Filed: May 3, 2004

(65) Prior Publication Data
US 2005/0262249 A1    Nov. 24, 2005

(51) Int. Cl.
G06F 15/16 (2006.01)
H04L 12/16 (2006.01)
(52) U.S. Cl. .................. 709/229; 709/202; 709/203; 709/204; 709/218; 709/219; 709/220; 709/227; 709/228; 709/237; 709/248; 370/260; 379/202.01
(58) Field of Classification Search ......... 709/202–204, 709/218–220, 227–229, 237, 248; 370/260; 379/202.01
See application file for complete search history.

(56) References Cited

U.S. PATENT DOCUMENTS

| | | | |
|---|---|---|---|
| 6,477,150 B1 * | 11/2002 | Maggenti et al. ............ 370/312 |
| 6,570,851 B1 * | 5/2003 | Koskelainen et al. ........ 370/231 |
| 6,763,035 B1 * | 7/2004 | Koskelainen et al. ........ 370/466 |
| 6,781,963 B2 * | 8/2004 | Crockett et al. ............. 370/260 |
| 7,024,688 B1 * | 4/2006 | Faccin et al. .................... 726/4 |
| 7,050,861 B1 * | 5/2006 | Lauzon et al. ................. 700/17 |
| 7,062,253 B2 * | 6/2006 | Money et al. ............... 455/406 |
| 7,085,244 B2 * | 8/2006 | Koskelainen et al. ........ 370/261 |
| 7,107,017 B2 * | 9/2006 | Koskelainen et al. ....... 455/90.2 |
| 7,130,282 B2 * | 10/2006 | Black ......................... 370/296 |
| 7,184,531 B2 * | 2/2007 | Crouch .................. 379/202.01 |
| 7,328,046 B2 * | 2/2008 | Koskelainen et al. ........ 455/561 |
| 7,359,373 B2 * | 4/2008 | Kuusinen et al. ............ 370/352 |

(Continued)

FOREIGN PATENT DOCUMENTS

JP    2002-041429    2/2002

(Continued)

OTHER PUBLICATIONS

"Requirements for Tightly Coupled Sip Conferencing"; Roxen.com; Levin et al.; pp. 1-12; Nov. 2002.*

(Continued)

Primary Examiner—Alina N. Boutah
(74) Attorney, Agent, or Firm—Harrington & Smith, PC

(57) ABSTRACT

A method is disclosed to share data amongst conference participants in a SIP conference. The method includes, in response to a request of a user agent (UA) conference participant to create a data sharing element, informing the UA in a SIP message of an address of a storage location associated with a data sharing server (DSS) of a conferencing server where the UA may store shared data for use by other conference participants; storing the data in the address of the storage location and establishing at least one policy that controls at least one of access to and distribution of the shared data with respect to the other conference participants. Also disclosed, as part of a SIP Conference Server (10), is a Data Sharing Server (14) that provides storage for, and controlled access to and distribution of the shared data stored by one or more of SIP conference participants.

54 Claims, 3 Drawing Sheets

U.S. PATENT DOCUMENTS

| | | | | |
|---|---|---|---|---|
| 7,418,509 | B2* | 8/2008 | Koskelainen et al. | 709/229 |
| 7,421,469 | B1* | 9/2008 | Liu et al. | 709/204 |
| 7,426,379 | B1* | 9/2008 | Stewart et al. | 455/401 |
| 7,469,293 | B1* | 12/2008 | Yoakum et al. | 709/227 |
| 7,480,723 | B2* | 1/2009 | Grabelsky et al. | 709/228 |
| 2002/0078153 | A1* | 6/2002 | Chung et al. | 709/204 |
| 2002/0087435 | A1 | 7/2002 | Neishi et al. | 706/27 |
| 2003/0069934 | A1* | 4/2003 | Garcia-Martin et al. | 709/206 |
| 2003/0093462 | A1* | 5/2003 | Koskelainen et al. | 709/203 |
| 2003/0145054 | A1* | 7/2003 | Dyke | 709/205 |
| 2003/0149774 | A1* | 8/2003 | McConnell et al. | 709/227 |
| 2003/0163545 | A1* | 8/2003 | Koskelainen et al. | 709/217 |
| 2004/0003046 | A1* | 1/2004 | Grabelsky et al. | 709/206 |
| 2004/0037406 | A1* | 2/2004 | Gourraud | 379/202.01 |
| 2004/0071099 | A1* | 4/2004 | Costa-Requena et al. | 370/260 |
| 2004/0107143 | A1* | 6/2004 | Niemi | 705/26 |
| 2004/0110535 | A1* | 6/2004 | Koskelainen et al. | 455/561 |
| 2004/0153552 | A1* | 8/2004 | Trossen et al. | 709/229 |
| 2004/0156394 | A1* | 8/2004 | Westman | 370/471 |
| 2004/0174830 | A1* | 9/2004 | Koskelainen et al. | 370/260 |
| 2004/0179689 | A1* | 9/2004 | Maggenti et al. | 380/270 |
| 2004/0181584 | A1* | 9/2004 | Rosen et al. | 709/206 |
| 2004/0190498 | A1* | 9/2004 | Kallio et al. | 370/352 |
| 2004/0190702 | A1* | 9/2004 | Mayer et al. | 379/202.01 |
| 2004/0196867 | A1* | 10/2004 | Ejzak et al. | 370/468 |
| 2004/0202303 | A1* | 10/2004 | Costa-Requena et al. | 379/205.01 |
| 2004/0221037 | A1* | 11/2004 | Costa-Requena et al. | 709/225 |
| 2004/0224710 | A1* | 11/2004 | Koskelainen et al. | 455/518 |
| 2004/0246332 | A1* | 12/2004 | Crouch | 348/14.08 |
| 2004/0250201 | A1* | 12/2004 | Caspi | 715/512 |
| 2004/0252674 | A1* | 12/2004 | Soininen et al. | 370/352 |
| 2005/0004982 | A1* | 1/2005 | Vernon et al. | 709/204 |
| 2005/0018828 | A1* | 1/2005 | Nierhaus et al. | 379/202.01 |
| 2005/0021716 | A1* | 1/2005 | Adamczyk et al. | 709/223 |
| 2005/0034079 | A1* | 2/2005 | Gunasekar et al. | 715/753 |
| 2005/0094621 | A1* | 5/2005 | Acharya et al. | 370/352 |
| 2005/0105511 | A1* | 5/2005 | Poikselka | 370/352 |
| 2005/0124365 | A1* | 6/2005 | Balasuriya et al. | 455/518 |
| 2005/0141688 | A1* | 6/2005 | Wengrovitz | 379/207.02 |
| 2005/0154793 | A1* | 7/2005 | Khartabil | 709/227 |
| 2005/0192052 | A1* | 9/2005 | Tenhunen | 455/557 |
| 2005/0198338 | A1* | 9/2005 | Chebil et al. | 709/230 |
| 2005/0206721 | A1* | 9/2005 | Bushmitch et al. | 348/14.09 |
| 2005/0213537 | A1* | 9/2005 | Ingimundarson et al. | 370/329 |
| 2005/0233776 | A1* | 10/2005 | Allen et al. | 455/567 |
| 2005/0262249 | A1* | 11/2005 | Koskelainen | 709/229 |
| 2006/0155839 | A1* | 7/2006 | Hundscheidt et al. | 709/224 |
| 2008/0059595 | A1* | 3/2008 | Kiss et al. | 709/206 |
| 2008/0228892 | A1* | 9/2008 | Staack et al. | 709/206 |
| 2008/0288643 | A1* | 11/2008 | Suotula et al. | 709/227 |

FOREIGN PATENT DOCUMENTS

| | | |
|---|---|---|
| JP | 2002-170070 | 7/2002 |
| WO | WO-2004/028113 A1 | 4/2004 |
| WO | WO-2005/071921 A1 | 8/2005 |

OTHER PUBLICATIONS

"Requirements for Floor Control"; Roxen.com, Internet Engineering Task Force; Koskelainen et al.; pp. 1-9; Oct. 31, 2002.*

"Efficacy of Floor Control Protocols in Distributed Multimedia Collaboration"; Cluster Computing; Dommel et al.; pp. 1-30; 1999.*

"A Framework for Conferencing with the Session Initiation Protocol"; Internet Engineering Task Force; J. Rosenberg; pp. 1-57; Oct. 28, 2002.*

"Use of Session Initiation Protocol (SIP) and Simple Object Access Protocol (SOAP) for Conference Floor Control"; Columbia University, Internet Engineering Task Force; Wu et al.; pp. 1-66; Jan. 14, 2003.*

"A SIP-based Conference Control Framework", Petri Koskelainen, Henning Schulzrinne andZiaotao Wu, NOSSDAV'02, May 12-14, 2002, Miami, Fl, USA.

"A Framework for Conferencing with the Session Initiation Protocol", J. Rosenberg, draft-ieft-sipping-conference-framework-01, Oct. 27, 2003.

"A Mechanism for Content Indirection in Session Initiation Protocol (SIP) Messages", S. Olson, Jun. 2, 2003.

* cited by examiner

APPARATUS AND METHOD TO PROVIDE CONFERENCE DATA SHARING BETWEEN USER AGENT CONFERENCE PARTICIPANTS

TECHNICAL FIELD

This invention relates generally to wireless communications systems and methods and, more specifically, relates to wireless terminals and wireless network nodes that use a Session Initiation Protocol (SIP) for establishing and conducting a multi-participant conference.

BACKGROUND

The Session Initiation Protocol (SIP) is defined in IETF RFC3261 (Rosenberg et al., June 2002). In general, the SIP is an application-layer control (signaling) protocol for creating, modifying and terminating sessions with one or more participants. The sessions can include Internet telephone calls, multimedia distribution and multimedia conferences. SIP invitations used to create sessions carry session descriptions that allow participants to agree on a set of compatible media types. SIP makes use of elements called proxy servers to help route requests to the user's current location, authenticate and authorize users for services, implement provider call-routing policies and provide features to users. SIP also provides a registration function that allows users to upload their current locations for use by proxy servers. SIP runs on top of several different transport protocols. Of most concern to this invention is the use of SIP for conferencing.

It is first noted that SIP includes a mechanism to provide access to data, referred to generally as content indirection. More specifically, an IETF draft "draft-ietf-sip-content-indirect-mech-03", entitled "A Mechanism for Content Indirection in Session Initiation Protocol (SIP) Messages" (S. Olson, Jun. 2, 2003), describes a mechanism to provide for content indirection in SIP messages. Generally, the purpose of the SIP is to create, modify, or terminate sessions with one or more participants, and SIP messages, like HTTP, are syntactically composed of a start line, one or more headers, and an optional body. Unlike HTTP, however, SIP is not designed as a general purpose transport of data.

There are various reasons why it may be desirable to indirectly specify the content of the SIP message body. For bandwidth limited applications, such as in cellular wireless applications, indirection provides a means to annotate the (indirect) content with meta-data which may be used by the recipient to determine whether or not to retrieve the content over the resource limited link. It is also possible that the content size to be transferred might potentially overwhelm intermediate signaling proxies, thereby unnecessarily increasing network latency. For time-sensitive SIP applications, this may be unacceptable. The use of indirect content can alleviate these shortcomings by moving the transfer of the content out of the SIP signaling network and into a potentially separate data transfer channel. There may also be scenarios where session-related data (body) that needs to be conveyed does not directly reside on the endpoint or User Agent (UA). In such scenarios, it is desirable to have a mechanism whereby the SIP message can contain an indirect reference to the desired content. The receiving party would then use this indirect reference to retrieve the content via a non-SIP transfer channel, such as HTTP, FTP, or LDAP. It is stated in this IETF draft that the purpose of content indirection is purely to provide an alternative transport mechanism for SIP MIME body parts. With the exception of the transport mechanism, indirected body parts are equivalent, and should have the same treatment, as in-line body parts.

The present inventor and others have previously identified the requirements for conference control and have proposed a component-based scalable conference control framework based on the SIP and on the Simple Object Access Protocol (SOAP). Reference in this regard can be made to: "A SIP-based Conference Control Framework", Petri Koskelainen, Henning Schulzrinne and Xiaotao Wu, *NOSSDAV'02*, May 12-14, 2002, Miami Beach, Fla., USA.

Also of interest is an Internet Draft entitled: "A Framework for Conferencing with the Session Initiation Protocol", J. Rosenberg, draft-ietf-sipping-conferencing-framework-01, Oct. 27, 2003.

In order to place the current invention into a proper technological context, a brief description of SIP conferencing will be presented. First a number of useful definitions will be provided, followed by a general discussion of SIP conferencing in the context of FIGS. 1 and 2.

Generally, a SIP conference is an instance of a multi-party conversation. A loosely coupled conference is a conference without coordinated signaling relationships amongst participants. Loosely coupled conferences frequently use multicast for distribution of conference memberships. A tightly coupled conference is a conference in which a single user agent, referred to as a focus, maintains a dialog with each participant. The focus plays the role of the centralized manager of the conference, and is addressed by a conference URI. The focus is a SIP user agent that is addressed by a conference URI and identifies a conference (i.e., a unique instance of a multi-party conversation). The focus maintains a SIP signaling relationship with each participant in the conference. The focus is responsible for ensuring, in some way, that each participant receives the media that make up the conference. The focus also implements conference policies. The focus is a logical role. A conference URI is a URI, usually a SIP URI, which identifies the focus of a conference. The software element that connects a user or automata to a conference is referred to as a participant. A participant implements, at a minimum, a SIP user agent, but may also include, as an example, a conference policy control protocol client. A conference notification service is a logical function provided by the focus. The focus can act as a notifier, accepting subscriptions to the conference state, and notifying subscribers about changes to that state. The state includes the state maintained by the focus itself, the conference policy, and the media policy. A conference policy server is a logical function which can store and manipulate the conference policy. The conference policy is the overall set of rules governing operation of the conference. It is broken into membership policy and media policy. Unlike the focus, there is not an instance of the conference policy server for each conference. Rather, there is an instance of the membership and media policies for each conference. A conference policy is the complete set of rules for a particular conference that is manipulated by the conference policy server. It includes the membership policy and the media policy. There is an instance of conference policy for each conference. A membership policy is a set of rules manipulated by the conference policy server regarding participation in a specific conference. These rules include directives on the lifespan of the conference, who can and cannot join the conference, definitions of roles available in the conference and the responsibilities associated with those roles, and policies on who is allowed to request which roles. A media policy is a set of rules manipulated by the conference policy server regarding the media composition of the conference. The media policy is used by the focus to determine the mixing characteristics for the conference. The media policy includes rules about which participants receive media from which other participants, and the ways in which that media is combined for each participant. In the case of audio, these rules can include the relative volumes at which each participant is mixed. In the case of video, these rules can indicate whether the video is tiled, whether the video indicates the loudest speaker, and so on. The Conference Policy Control Protocol (CPCP) is a protocol used by clients to manipulate the conference policy. A mixer is a component that receives a set of media streams of the same type, and combines their media in a type-specific manner, redistributing the result to each participant. This includes media transported using RTP (see RFC 1889). In the content of the draft-ietf-sipping-conferencing-framework-01 document, from which these various definitions are conveniently derived, the mixer is considered to be a superset of the mixer concept defined in RFC 1889, since it allows for non-RTP-based media, such as instant messaging sessions. A conference server is a physical server that contains, at a minimum, the focus. It may also include the conference policy server and mixers.

Having thus provided a number of useful definitions, reference is made to FIG. 1. The central component in a SIP conference is the focus 1. The focus 1 maintains a SIP signaling relationship with each participant 2 in the conference (a participant may be referred to as a user agent (UA), as in FIG. 2). The result is a star topology. The focus 1 is responsible for ensuring that the media streams that constitute the conference are available to the participants 2 in the conference. The focus 1 performs this function through the use of one or more mixers 3, each of which combines a number of input media streams to produce one or more output media streams. The focus 1 uses the media policy to determine the proper configuration of the mixers 3. The focus 1 has access to the conference policy (composed of the membership and media policies), an instance of which exist for each conference. Effectively, the conference policy can be thought of as a database which describes the way that the conference should operate. It is the responsibility of the focus 1 to enforce those policies. Not only does the focus 1 need read access to the database, it needs to know when the database has changed. Such changes might result in SIP signaling (for example, the ejection of a user from the conference), and most changes will require a notification to be sent to subscribers using the conference notification service. The conference is represented by a URI, which identifies the focus 1. Each conference has a unique focus 1 and a unique URI identifying that focus 1. Requests to the conference URI are routed to the focus 1 for that specific conference. Users usually join the conference by sending an INVITE to the conference URI. As long as the conference policy allows, the INVITE is accepted by the focus 1 and the user is brought into the conference. Users can leave the conference by sending a BYE, as would be done in a normal call. Similarly, the focus 1 can terminate a dialog with a participant 2, should the conference policy change to indicate that the participant is no longer allowed in the conference. A focus 1 can also initiate an INVITE, should the conference policy indicate that the focus 1 needs to bring a participant into the conference.

FIG. 2 provides an overall view of conference functions. The participant 2 can interact with the focus 1 using extensions, such as REFER, in order to access enhanced call control functions. The participant 2 can SUBSCRIBE to the conference URI, and be connected to the conference notification service provided by the focus 1. Through this mechanism, it can learn about changes in participants (effectively, the state of the dialogs), the media policy, and the membership policy. The participant 2 can communicate with the conference policy server (CPS) 4 using a conference policy control protocol (CPCP) 5. Through the use of the CPCP 5 the participant 2 can affect the conference policy 6. The conference policy server 4 need not be available in any particular conference, although there is always a conference policy 6. The interfaces between the focus 1 and the conference policy 6, and the conference policy server 4 and the conference policy 6, are intended primarily to show the logical roles involved in a conference. Also shown for completeness in FIG. 2 is a conference notification service 7 coupled to the participant 2 via a subscription interface.

It is fundamental to the overall framework described in the draft-ietf-sipping-conferencing-framework-01 document that a conference is uniquely identified by a URI, and that this URI identifies the focus 1 which is responsible for the conference. The conference URI is unique, such that no two conferences have the same conference URI. A conference URI is always a SIP or SIPS (Secure SIP) URI. The conference URI is opaque to any participants which might use it, that is, there is no way to look at the URI, and know for certain whether it identifies a focus 1, as opposed to a user or an interface on a PSTN gateway. However, contextual information surrounding the URI (for example, SIP header parameters) may indicate that the URI represents a conference. When a SIP Request is sent to the conference URI, that request is routed to the focus 1, and only to the focus 1. The element or system that creates the conference URI is responsible for guaranteeing this property. The conference URI can represent a long-lived conference or interest group, or the conference URI can represent a short-lived conference, such as an ad-hoc conference.

Prior to this invention, an aspect of SIP conferencing that was not adequately defined or specified related to the concept of data sharing among the conference participants 2.

SUMMARY OF THE PREFERRED EMBODIMENTS

The foregoing and other problems are overcome, and other advantages are realized, in accordance with the presently preferred embodiments of these teachings.

This invention relates to the concept of conference policy manipulation, wherein a user can create a conference at a conference policy server (CPS) using a Conference Policy Control Protocol (CPCP), and set various conference parameters, such as Access Control Lists (ACLs), a dial-out user list, and RTP media streams.

In accordance with this invention there are described additional use cases and mechanisms for multi-party conferencing, specifically data sharing. Data sharing in accordance with this invention can be distinguished from application sharing (which may share documents), in that application sharing typically requires the presence of specific applications in end-terminals.

In SIP conferencing data sharing, in accordance with this invention, users are able to upload documents, files and data to the CPS, and use the CPCP to set access policies and manipulation operations for the uploaded data. For example, a user may upload a music file and specify that all conference participants can have read access to the music file, but that they may not delete it.

The CPS may also manipulate documents, including documents containing image data, based on instructions provided via the CPCP as extended in accordance with this invention. As non-limiting examples, document manipulation operations can involve re-sizing an image, converting a document from one format to another, and pushing a document to all conference participants.

An aspect of this invention is a binding together of data sharing and the CPCP in a novel and non-obvious manner to enable document manipulation and thus create new service(s) for IP, SIP-based conferencing.

In one aspect this invention provides a method to share data amongst conference participants in a SIP conference. The method includes, in response to a request of a user agent (UA) conference participant to create a data sharing element, informing the UA in a SIP message of an address of a storage location associated with a data sharing server (DSS) of a conferencing server where the UA may store shared data for use by other conference participants; storing the data in the address of the storage location and establishing at least one policy that controls at least one of access to and distribution of the shared data with respect to the other conference participants.

Also disclosed, as part of a SIP Conference Server, is a Data Sharing Server (DSS) that provides storage for, and controlled access to and distribution of the shared data stored by one or more of SIP conference participants.

Thus, in another aspect this invention provides a SIP Conference Server that includes at least one data processor that is responsive to an occurrence of a UA conference participant desiring to create a data sharing element, to inform the UA in a SIP message of an address of a storage location associated with the DSS where the UA may store shared data for use by other conference participants. The data processor is further responsive to receipt of the data from the UA to store the data in the address of the storage location, and to establish at least one policy that controls at least one of access to and distribution of the shared data with respect to the other conference participants.

In a further aspect this invention provides a UA operable with a SIP Conference Server, where the UA includes at least one data processor that is functional as a conference participant and to request the SIP Conference Server to create a data sharing element; to receive a notification in a SIP message of an address of a storage location associated with the DSS where the UA may store shared data for use by other conference participants; to send data to the DSS for storage in the address of the storage location and to send information to a Conference Policy Server (CPS) via a Conference Policy Control Protocol (CPCP) to establish at least one policy that controls at least one of access to and distribution of the shared data with respect to the other conference participants.

In the preferred embodiments of this invention the data is sent to the DSS by using a non-SIP procedure, such as by using one of HTTP; Web-based Distributed Authoring and Versioning (WebDav); RTP; and a TCP pipe with Multipurpose Internet Mail Extensions (MIME) encapsulation.

In the preferred embodiments of this invention the UA receives the notification of the address in a Uniform Resource Identifier (URI) that specifies the address of the storage location.

In the preferred embodiments of this invention the data is sent to the DSS in conjunction with at least a name for the data, and may be sent also with a type of the data. The shared data may comprise at least one of a file and an executable application.

The UA may be, or may be a part of, a cellular telephone.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 3:
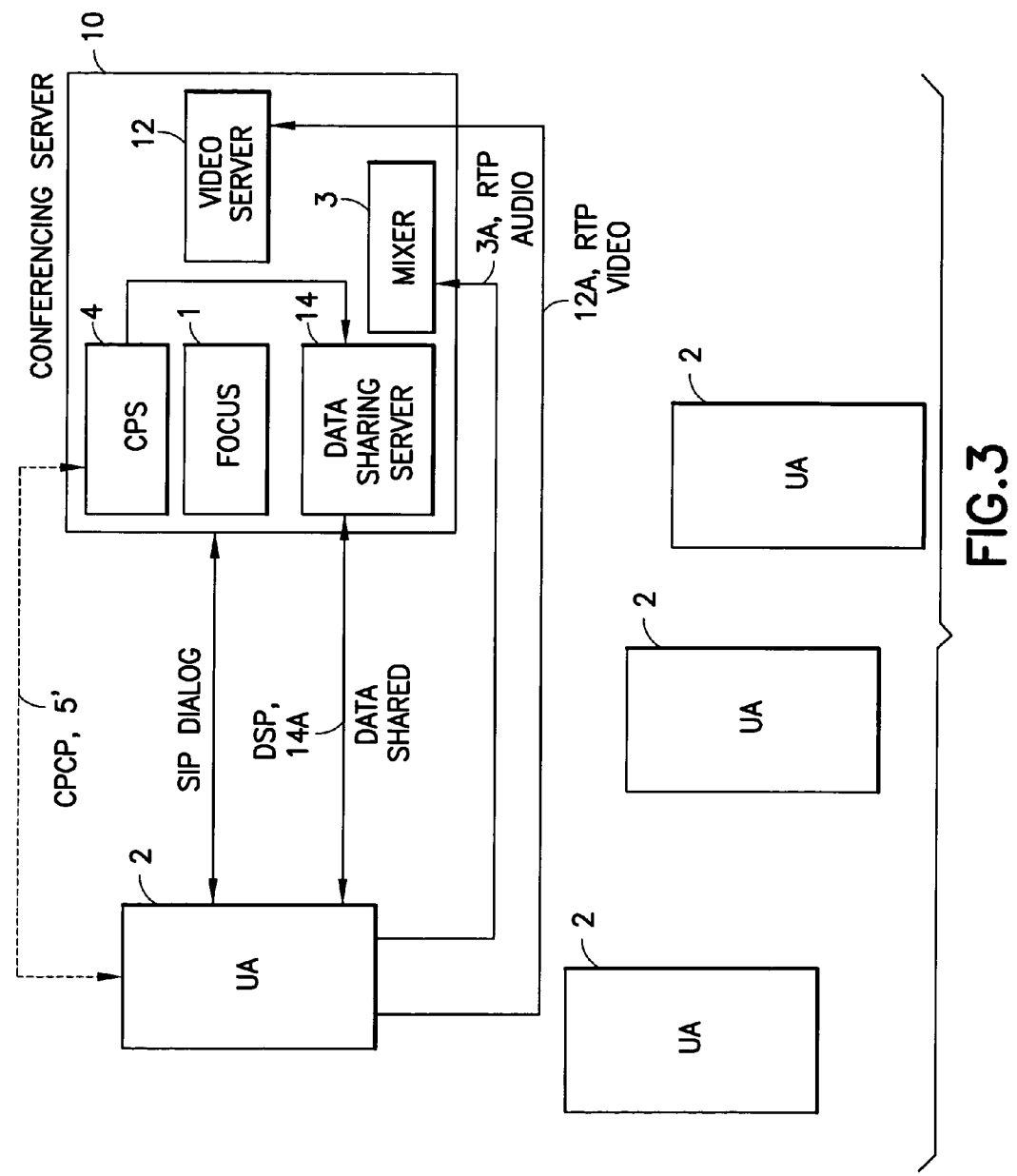
FIG. 3 shows a conferencing server and its interfaces with the user agent, in accordance with an embodiment of this invention.

Reference is made to FIG. 3 for showing a conferencing server 10 and its interfaces with the UA 2, in accordance with an embodiment of this invention. The other UAs 2 shown in FIG. 3 are assumed to also be conference participants, and to be coupled in a similar manner to the conferencing server 10. The UA 2 is coupled to the focus 1 via the SIP dialog, and to the CPS 4 via a CPCP that is modified to operate in accordance with this invention, and is thus referred to as the CPCP 5'. The conferencing server 10 further includes at least one mixer 3, a video server 12 and, in accordance with this invention, a Data Sharing Server (DSS) 14. The UA 2 is coupled to the mixer 3, the video server 12 and the DSS 14 via an RTP Audio interface 3A, an RTP Video interface 12A and a Shared Data Interface that implements a Data Sharing Protocol (DSP) 14A, respectively.

Figure 1:
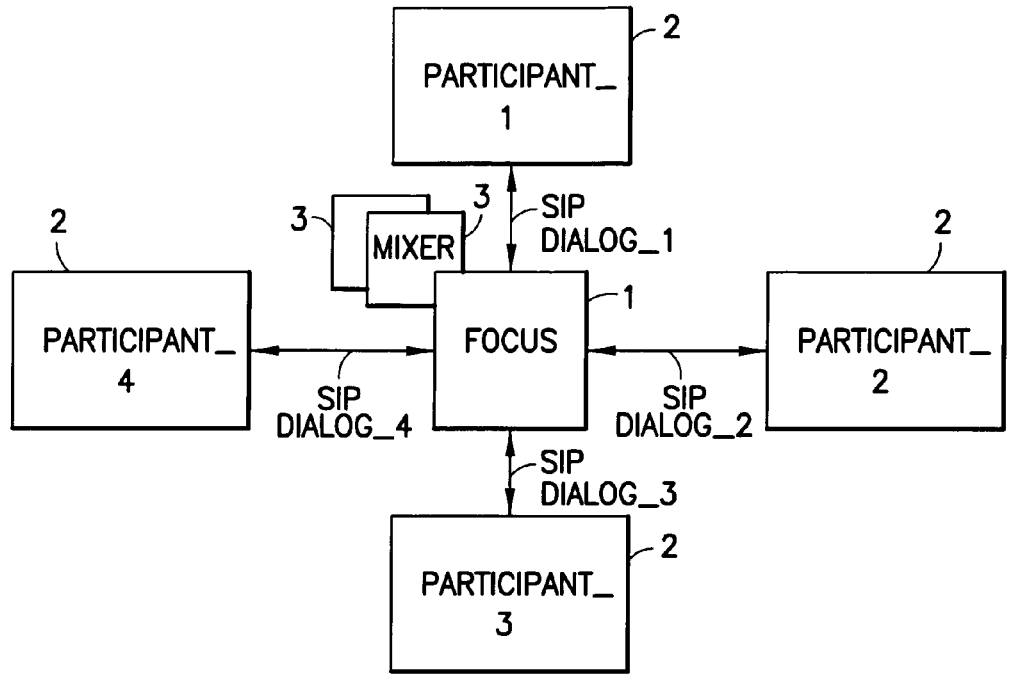
FIG. 1 is a block diagram showing a conventional SIP conference having a focus and a plurality of participants arranged in a star topology.
Figure 2:
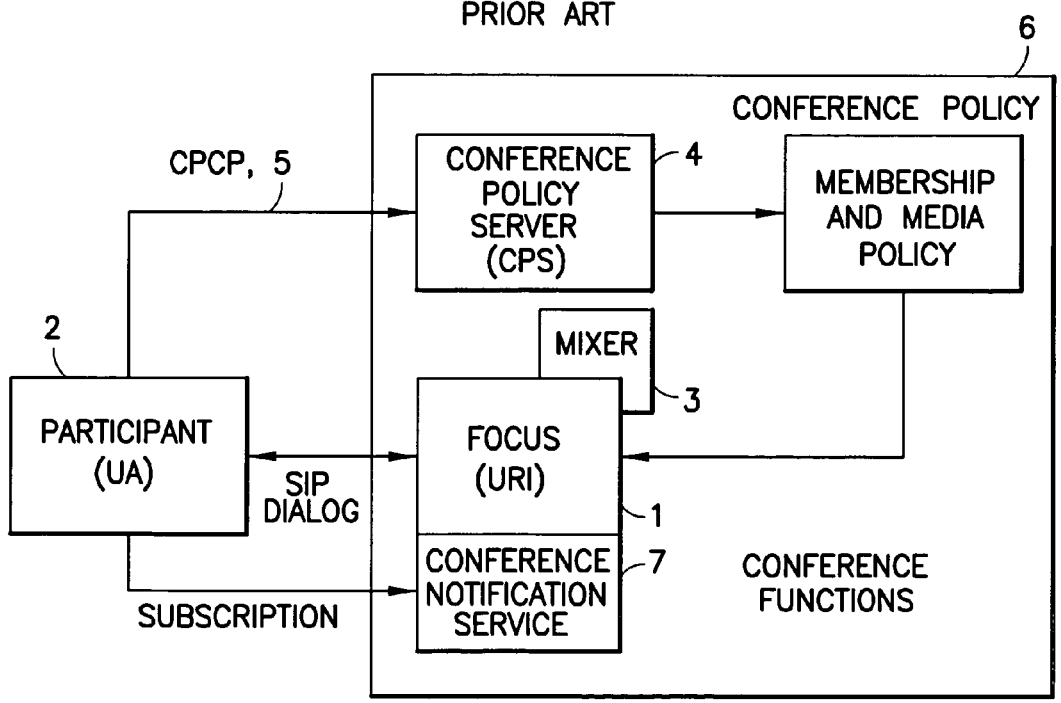
FIG. 2 is a block diagram showing a participant (user agent) and its connections to various conference functions, in accordance with the prior art.

In general, the DSS 14 can be co-located with CPS 4, or it can be implemented as a separate server that is controlled by the CPS 4, as shown in FIG. 3. The conference policy 6 (shown in FIG. 2) can be modified via the CPS 4 and the CPCP 5' to define what type of shared data is stored by the DSS 14, what participant(s) can read/write/modify the shared data, and how the shared data is acted upon by the DSS 14. The shared data can be in the form of files, or in the form of active, running applications, and are accessed through the Shared Data Interface using the DSP 14A, preferably, by a non-SIP mechanism such as the Transmission Control Protocol (TCP). One non-limiting example of a running application is a game.

The DSP 14A may be implemented using any one of the following (non-limiting) transport mechanisms: HTTP; Web-based Distributed Authoring and Versioning (WebDav), which is a set of extensions to the HTTP protocol that allows users to collaboratively edit and manage files on remote web servers; RTP, preferably with forward error correction that accommodates multi-cast operation; a TCP pipe with Multipurpose Internet Mail Extensions (MIME) encapsulation; and variations of the foregoing. The primary function of the DSP 14A is to convey data between the client (UA 2) and the DSS 14. It is also preferred that the DSP 14A convey some minimal information concerning the shared data, such the name associated with the shared data (as in RTP headers, or MIME headers that precede the actual data).

In general, MIME was originally intended to extend the format of Internet mail to allow non-US-ASCII textual messages, non-textual messages, multipart message bodies and non-US-ASCII information in message headers. The following RFCs define MIME: RFC 2045: MIME Part One: Format of Internet Message Bodies; RFC 2046: MIME Part Two: Media Types; RFC 2047: MIME Part Three: Message Header Extensions for Non-ASCII Text; RFC 2048: MIME Part Four: Registration Procedures; and RFC 2049: MIME Part Five: Conformance Criteria and Examples.

Exemplary policy commands that can be issued by clients (UAs 2) include, but are not limited to:

a) Any participant can read my files at the DSS 14;
b) Participant x (e.g., my assistant) can update my files at the DSS 14;
c) My "proximity blob" activates on Fridays;
d) I should be alerted when participant y reads the file for image_1; and
e) JPEG data should be sent to all participants (but reduced to QCIF for those clients having small displays). QCIF is the Quarter Common Intermediate Format, a videoconferencing format that specifies data rates of 30 frames per second (fps), with each frame containing 144 lines and 176 pixels per line, i.e., one fourth the resolution of full CIF (QCIF support is required by the ITU H.261 videoconferencing standard).

In the embodiment of FIG. 3 the conferencing server 10 produces output data to its members based on its state. For example, if floor control is in use, only one audio is passed through the mixer 3. In the typical case any UA 2 can share data by storing data in the DSS 14, and give (or deny) access rights to other UAs, using the CPCP 5', as discussed above. The conferencing server 10 may send or push data from the DSS 14, possibly manipulated (e.g., video data as QCIF video data from the video server 12) to conference participants.

Figure 4:
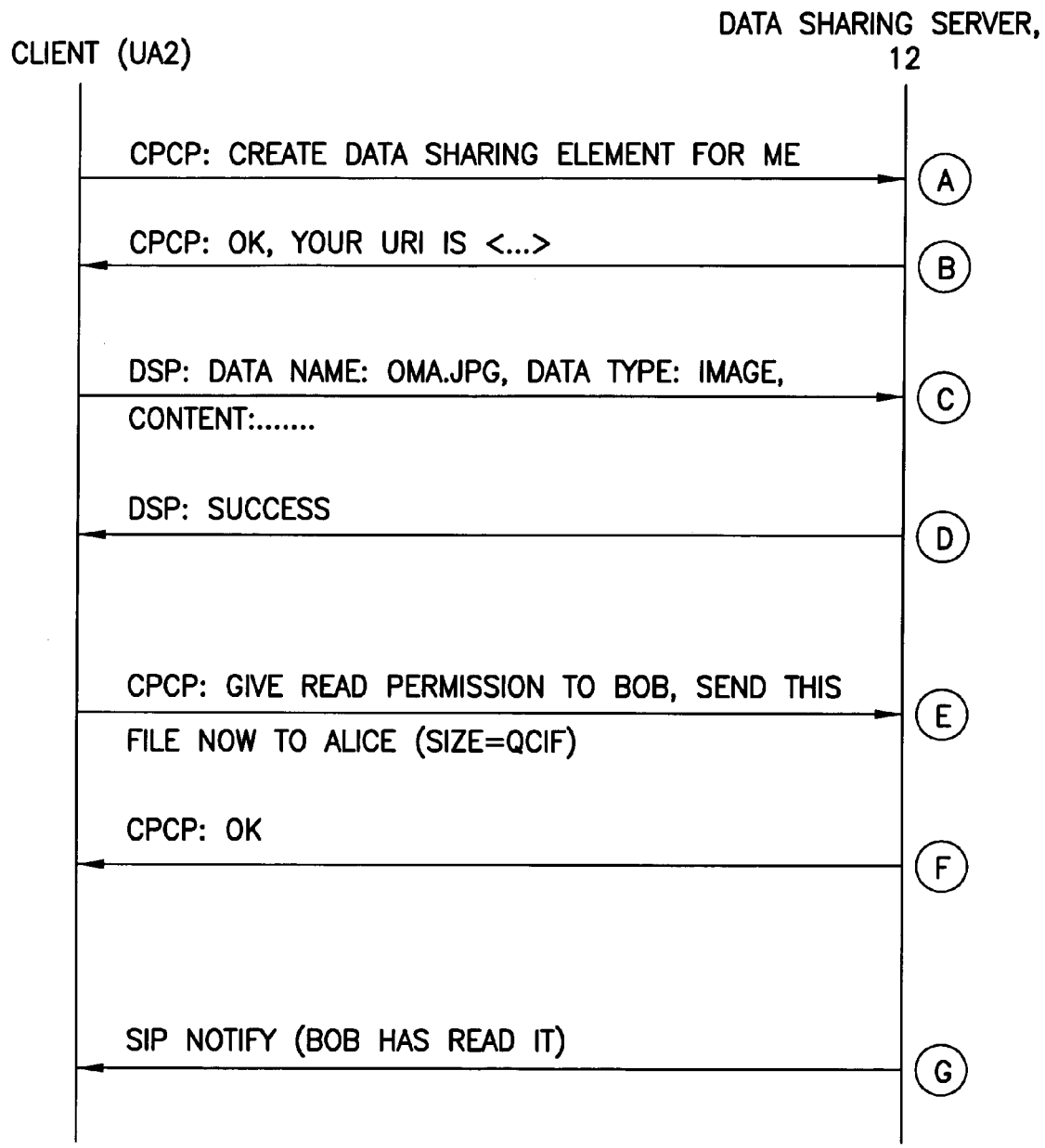
FIG. 4 is a signaling and data flow diagram showing the interaction between a client user agent and a data sharing server that forms a part of the conferencing server shown in FIG. 3.

Reference is made to FIG. 4 for showing a signaling and data flow diagram that illustrates the interaction between a client UA 2 and the DSS 14. In step A the UA 2 requests that the DSS 14 create a data sharing element. This request is made via the CPCP 5' and the CPS 4. In step B the UA 2 is informed by the DSS 14, via the CPS 4 and the CPCP 5', of a URI that identifies an address in the DSS 14 of a shared data storage location allocated to the UA 2. In step C the UA 2 sends the shared data over the DSP 14A (e.g. using HTTP) to the URI identified in step B. As was noted earlier, preferably information is also sent, in addition to the data content, for identifying the data (e.g., the data name, the data type).

While this may occur by the use of a SIP content indirection operation, in the presently preferred embodiment of this invention the SIP payload (SDP) is used to advertise to the user joining a conference the various information needed to provide and support the data sharing function. For example, the user can be informed through the SIP payload of the address of the RTP audio mixer 3, the RTP video server 12 and, further in accordance with an aspect of this invention, the address of the DDS 14. In the presently preferred embodiment the Conference Policy Control Protocol 5' is used to define the operations and policy for the data in the DSS 14.

Continuing with the discussion of FIG. 4, at step D the DSP 14A is used to indicate the success of the data storage operation to the UA 2, and at step E the UA 2 sends at least one conference-related shared data policy command, such as an instruction to give conference participant Bob read permission to the stored shared data file, and an instruction to send the stored shared data file to participant Alice (compressed using QCIF). At step F the receipt (or execution) of these commands is acknowledged, and at Step G a SIP Notify message is sent (via the SIP dialog) to inform the client that participant Bob has read the file.

The foregoing commands, interactions and data flows shown in FIG. 4 are clearly exemplary, and are not intended to be read in a limiting sense upon the practice of this invention.

It is understood that in the foregoing embodiments the SIP Conferencing Server 10 and the UA 2 each contain one or more programmed digital data processors operable for executing the SIP-related conference data sharing procedures and protocols in accordance with this invention. For example, the UA 2 may be embodied in a cellular telephone or a personal communicator that includes an embedded microprocessor that operates in accordance with a computer readable medium embodied with a stored computer program for performing extraction of the URI from a SIP message received from the SIP Conferencing Server 10, and for then subsequently sending the data to be shared to the DSS 14 to be stored at the address specified by the extracted URI.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent file types, message formats, data transport mechanisms and the like may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
   in response to a request of a user agent conference participant of a plurality of user agent conference participants to create a data sharing element, informing the user agent conference participant in a session initiation protocol message of an address of a storage location associated with a data sharing server of a conferencing server where the user agent conference participant may store a shared media data file for use by at least one other of the plurality of user agent conference participants;
   storing the shared media data file at the address of the storage location; and
   establishing at least one conference policy that controls at least one of access to and distribution of the shared media data file with respect to the other user agent conference participants of the plurality of user agent conference participants, wherein the data sharing element comprises the shared media data file.

2. A method as in claim 1, where storing uses a data sharing server procedure.

3. A method as in claim 1, where storing uses one of hypertext transfer protocol; web-based distributed authoring and versioning; real-time transport protocol; and a transmission control protocol pipe with multipurpose internet mail extensions encapsulation.

4. A method as in claim 1, where informing supplies the user agent with a uniform resource identifier that specifies the address of the storage location.

5. A method as in claim 1, where storing also includes providing at least a name for the stored shared media data file.

6. A method as in claim 1, where storing also includes providing at least a name for, and a type of, the stored shared media data file.

7. A method as in claim 1, where the shared media data file comprises at least one of a media data file and an executable application.

8. A method as in claim 1, further comprising manipulating the shared media data file, wherein the manipulation comprises resizing an image.

9. A method as in claim 1, further comprising manipulating the shared media data file, wherein the manipulation comprises pushing the shared media data file to the at least one other of the plurality of user agent conference participants.

10. A method as in claim 1, further comprising manipulating the shared media data file, wherein the manipulation comprises converting the shared media data file from one format to another.

11. A method as in claim 1, further comprising providing manipulated data from the conferencing server to at least one of the user agent conference participants of the plurality of user agent conference participants.

12. An apparatus comprising: a conferencing server that is responsive to an occurrence of a user agent conference participant of a plurality of user agent conference participants desiring to create a data sharing element, to inform the user agent conference participant in a session initiation protocol message of an address of a storage location associated with a data sharing server where the user agent may store a shared media data file for use by at least one other of the plurality of user agent conference participants; said conferencing server being further responsive to receipt of the data from the user agent conference participant to store the shared media data file at the address of the storage location; and to establish at least one conference policy that controls at least one of access to and distribution of the shared media data file with respect to the at least one other of the plurality of user agent conference participants, wherein the data sharing element comprises the shared media data file.

13. An apparatus as in claim 12, where the data is received by using a non-session initiation protocol procedure.

14. An apparatus as in claim 12, where the data is received by using one of hypertext transfer protocol; web-based distributed authoring and versioning; real-time transport protocol; and a transmission control protocol pipe with multipurpose internet mail extensions encapsulation.

15. An apparatus as in claim 12, where the server informs the user agent of the address by using a uniform resource identifier that specifies the address of the storage location.

16. An apparatus as in claim 12, where the data is received in conjunction with at least a name for the stored shared media data file.

17. An apparatus as in claim 12, where the data is received in conjunction with at least a name for, and a type of, the stored shared media data file.

18. An apparatus as in claim 12, where the shared media data file comprises at least one of a media data file and an executable application.

19. An apparatus as in claim 12, wherein the conferencing server is arranged to provide manipulated data to the plurality of user agent conference participants.

20. An apparatus comprising: a data processor arranged to request a conferencing server to create a data sharing element, to receive an address of a storage location associated with a data sharing server where a user agent conference participant may store a shared media data file for use by at least one of a plurality of other user agent conference participants; to send the shared media data file to the data sharing server for storage at the address of the storage location; and to send information to a conference policy server to establish at least one conference policy that controls at least one of access to and distribution of the shared media data file with respect to the at least one of a plurality of other user agent conference, wherein the data sharing element comprises the shared media data file.

21. An apparatus as in claim 20, where the shared media data file is sent to the data sharing server by using a non-session initiation protocol procedure.

22. An apparatus as in claim 20, where the data is sent to the DSS by using one of hypertext transfer protocol; web-based distributed authoring and versioning; real-time transport protocol; and a transmission control protocol pipe with multipurpose internet mail extensions encapsulation.

23. An apparatus as in claim 20, where the apparatus receives notification of the address in a uniform resource identifier that specifies the address of the storage location.

24. An apparatus as in claim 20, where the data is sent to the data sharing server in conjunction with at least a name for the shared media data file.

25. An apparatus as in claim 20, where the data is sent to the data sharing server in conjunction with at least a name for, and a type of, the shared media data file.

26. An apparatus as in claim 20, where the shared media data file comprises at least one of a media data file and an executable application.

27. An apparatus as in claim 20, where the apparatus is comprised of a cellular telephone.

28. An apparatus as in claim 20, wherein the data processor is arranged to receive a notification in a session initiation protocol message of the address of the storage location associated with the data sharing server where the user agent may store the shared media data file for use by the other conference participants.

29. An apparatus as in claim 20, wherein the conference policy server is arranged to establish the at least one policy that controls the at least one of access to and distribution of the shared media data file with respect to the other conference participants via a conference policy control protocol.

30. A computer readable medium embodied with a computer program comprising operations of:
   in response to a request of a user agent conference participant to create a data sharing element, informing the user agent conference participant in a session initiation protocol message of an address of a storage location where the user agent conference participant may store a shared media data file for use by at least one other of a plurality of user agent conference participants;
   storing the shared media data file at the address of the storage location; and
   establishing at least one conference policy that controls at least one of access to and distribution of the shared media data file with respect to other user agent conference participants of the plurality of user agent conference participants, wherein the data sharing element comprises the shared media data file.

31. A computer readable medium as in claim 30, where the message comprises a session initiation protocol message.

32. A computer readable medium as in claim 31, where the storing operation uses a data sharing server procedure.

33. A computer readable medium as in claim 30, where the storing operation uses one of hypertext transfer protocol; web-based distributed authoring and versioning; real-time transport protocol; and a transmission control protocol pipe with multipurpose internet mail extensions encapsulation.

34. A computer readable medium as in claim 30, where the informing operations supplies the user agent with a uniform resource identifier that specifies the address of the storage location.

35. A computer readable medium as in claim 30, where the storing operation also includes providing at least a name for the stored shared media data file.

36. A computer readable medium as in claim 30, where the storing operation also includes providing at least a name for, and a type of, the stored shared media data file.

37. A computer readable medium as in claim 30, where the shared media data file comprises at least one of a media data file and an executable application.

38. A conference server, comprising:
means, responsive to a request of a user agent conference participant to create a data sharing element, for informing the user agent conference participant in a session initiation protocol message of an address associated with storage means where the user agent conference participant may store a shared media data file for use by at least one other of a plurality of user agent conference participants;
means for storing the shared media data file at the address; and
means for establishing at least one conference policy that controls at least one of access to and distribution of the shared media data file with respect to the at least one other of the plurality of user agent conference, wherein the data sharing element comprises the shared media data file.

39. A conference server as in claim 38, where the message comprises a session initiation protocol message.

40. A conference server as in claim 39, where said means for storing uses a data sharing server procedure.

41. A conference server as in claim 38, where the shared media data file is received by using one of hypertext transfer protocol; web-based distributed authoring and versioning; real-time transport protocol; and a transmission control protocol pipe with multipurpose internet mail extensions encapsulation.

42. A conference server as in claim 38, where said means for informing informs the user agent of the address with a uniform resource identifier that specifies the address.

43. A computer readable medium embodied with a computer program comprising operations of:
requesting, by a user agent conference participant of a plurality of user agent conference participants via a session initiation protocol, creation of a data sharing element by a conferencing server;
receiving an address of a storage location where the user agent conference participant may store a shared media data file for use by other conference participants;
sending the shared media data file for storage at the address of the storage location; and
sending information to a conference server to establish at least one conference policy that controls at least one of access to and distribution of the shared media data file with respect to the other user agent conference participants of the plurality of user agent conference participants, wherein the data sharing element comprises the shared media data file.

44. A computer readable medium as in claim 43, where the shared media data file is sent by using a data sharing server procedure.

45. A computer readable medium as in claim 44, receiving a notification in a session initiation protocol message of the address of the storage location where the user agent may store the shared media data file for use by the other conference participants.

46. A method comprising:
requesting, by a user agent conference participant of a plurality of user agent conference participants, a conferencing server through a session initiation protocol dialog to create a data sharing element;
receiving an address of a storage location associated with a data sharing server where the user agent conference participant is permitted to store a shared media data file for use by at least one other of the plurality of user agent conference participants;
sending the shared media data file to the data sharing server for storage at the address of the storage location; and
sending information to a conference policy server to establish at least one conference policy that controls at least one of access to and distribution of the shared media data file with respect to the at least one other of the plurality of user agent conference participants, wherein the data sharing element comprises the shared media data file.

47. A method as in claim 46, comprising sending the shared media data file to the data sharing server by using a non-session initiation protocol procedure.

48. A method as in claim 46, comprising establishing the at least one policy that controls the at least one of access to and distribution of the shared media data file with respect to the other conference participants via a conference policy control protocol.

49. A method as in claim 46, comprising sending the shared media data file to the data sharing server by using one of hypertext transfer protocol; web-based distributed authoring and versioning; real-time transport protocol; and a transmission control protocol pipe with multipurpose internet mail extensions encapsulation.

50. A method as in claim 46, comprising receiving notification at the user agent conference participant of the address in a uniform resource identifier that specifies the address of the storage location.

51. A method as in claim 46, comprising sending the shared media data file to the data sharing server in conjunction with at least a name for the shared media data file.

52. A method as in claim 46, comprising sending the shared media data file to the data sharing server in conjunction with at least a name for, and a type of, the shared media data file.

53. A method as in claim 46, wherein the shared media data file comprises at least one of a media data file and an executable application.

54. A method as in claim 46, comprising receiving a notification of the address of the storage location associated with the data sharing server where the user agent conference participant is permitted to store the shared media data file for use by the at least one other of the plurality of user agent conference participants.

* * * * *